INVENTORS
FERDINANDO GASPARINI
LUIGI MALESANI

ATTORNEYS

United States Patent Office 3,497,793
Patented Feb. 24, 1970

3,497,793
ERROR COMPENSATION APPARATUS FOR INSTRUMENT TRANSFORMERS
Ferdinando Gasparini and Luigi Malesani, Padova, Italy, assignors of one-third to Industrie Elettriche di Legnano S.p.A., Legnano, Italy, a firm
Filed Oct. 28, 1966, Ser. No. 590,312
Claims priority, application Italy, July 5, 1966, 19,830/66
Int. Cl. G05f 1/40, 1/60
U.S. Cl. 323—4
4 Claims

ABSTRACT OF THE DISCLOSURE

Apparatus for automatically compensating errors in instrument transformers of both the current and voltage type. An additional transformer functions as an image transformer for comparing the output of the instrument transformer with an impedance load with what the output should be with no load, and an amplifier responsive to the image transformer to supply an appropriate input to the instrument transformer to change the output of the instrument transformer to what it would be with no impedance load.

---

This invention relates to instrument transformers or measuring transformers.

Current instrument transformers and voltage instrument transformers are intrinsically affected by errors: the amplitudes of the primary quantity $A_1$ and the secondary quantity $A_2$ in such transformers ought to be in a constant ratio $K_n$ (nominal transformer ratio) and ought to be of identical phase. In actual fact however, this does not happen for well known reasons, whence every transformer is of its own account affected by a ratio error $\eta$ and by a phase error $\epsilon$; the value of $\eta$ is expressed in the following way:

$$\eta = \frac{K_n A_2 - A_1}{A_1}$$

while $\epsilon$ indicates the angle (in radians) of the phase advance of $A_2$ relative to $A_1$. Said errors are not constant and depend on different quantities: in particular, and predominantly, on various characteristics of the secondary load, (of impedance $Z_u$ or admittance $Y_u = 1/Z_u$). This, in fact, requires, in the case of current transformers, the presence of a flux $\phi$ in the magnetic circuit approximately proportional to $Z_u$, while in the case of voltage transformers a voltage fall of $\Delta V$ occurs which is approximately proportional to $Y_u$. The errors are connected, for current transformers, to the value of the curent $I_0$, necessary to produce the flux $\phi$; and for voltage transformers instead to the value of $\Delta V$. Thus by supplying either the current $I_0$ or an electromotive force compensating $\Delta V$, it is possible to eliminate the errors.

The present invention relates to apparatus characterized by the fact that it automatically supplies, in the case of a current instrument transformer, the current $I_0$ necesseary to maintain in the magnetic circuit of said transformers exactly the flux $\phi$ required by the load conditions, and in the case of a voltage instrument transformer, on the other hand, the electromotive force which exactly compensates the voltage fall $\Delta V$ produced by current absorption on the part of the load.

Figure 1:
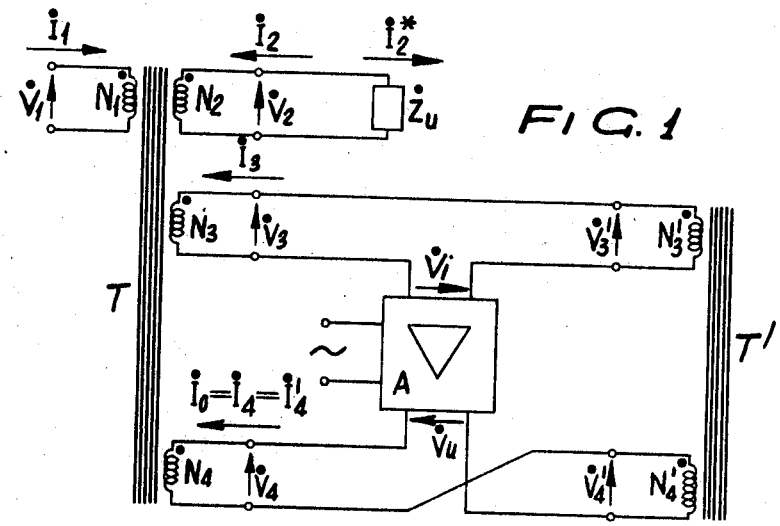
FIG. 1 is an electrical schematic diagram of a first embodiment of the invention.

The invention shown in FIG. 1 uses a special current instrument transformer T which has four windings, these being:

$N_1$—the primary winding;
$N_2$—the secondary winding;
$N_3$—an auxiliary winding for measuring the flux through the core of the transformer T;
$N_4$—an auxiliary winding for adjusting the flux in the core by circulating a correction current $\dot{I}_0$ to correct the flux error in the core.

An impedance load $\dot{Z}_u$ is connected to the secondary winding $N_2$ and is usually the measuring instrument itself.

The correction portion of the circuit connected to the windings $N_3$ and $N_4$ uses a transformer T' which is a transformer having substantially the same characteristics as the transformer T. The transformer T' creates a magnetic image of the transformer T in an unloaded condition in that the only difference between the transformer T' and the transformer T is that there is no secondary load on the transformer T'. The transformer T', has windings $N_3'$ and $N_4'$ corresponding to windings $N_3$ and $N_4$ of transformer T.

The windings $N_3$ and $N_3'$ are connected in series with each other and the input side of a high impedance, high gain transistor or electronic valve amplifier A. The windings $N_3$ and $N_3'$ are so connected that the voltages thereacross subtract and the voltage $V_i$ across the input of the amplifier A is the difference therebetween.

The amplifier A is connected to an external power source and the output thereof is connected in series with the windings $N_4$ and $N_4'$. The windings $N_4$ and $N_4'$ are connected so that the voltages thereacross sum.

When the load $\dot{Z}_u$ is zero, the flux $\Phi$ is also near zero and no voltage is induced in $N_3$. In this case the amplifier A is at rest $$(\dot{V}_i = \dot{V}_u = 0)$$

When a load $\dot{Z}_u$ appears across winding $N_2$, the flux $\Phi$ through the core of the transformer T rises up and this causes a voltage $V_3$ which is not balanced from $V_3'$. A voltage $$\dot{V}_i \neq 0$$

is produced and, in turn, a voltage $$\dot{V}_u \neq 0$$

This causes a current $\dot{I}_0$ to flow through windings $N_4$ and $N_4'$ until the voltage across winding $N_3$ equals the voltage across winding $N_3'$ and voltage $V_i$ is zero. In such conditions the fluxes $$\dot{\Phi} \text{ (in } T\text{) and } \dot{\Phi}' \text{ (in } T'\text{)}$$

are nearly equal (the current $\dot{I}_0$ produces $\dot{\Phi}'$ in $T'$ and $\dot{\Phi}$ in $T$)

Thus any error in T is eliminated because the magnetizing current $\dot{I}_0$ is supplied from the amplifier A to the winding $N_4$ of T.

Figure 2:
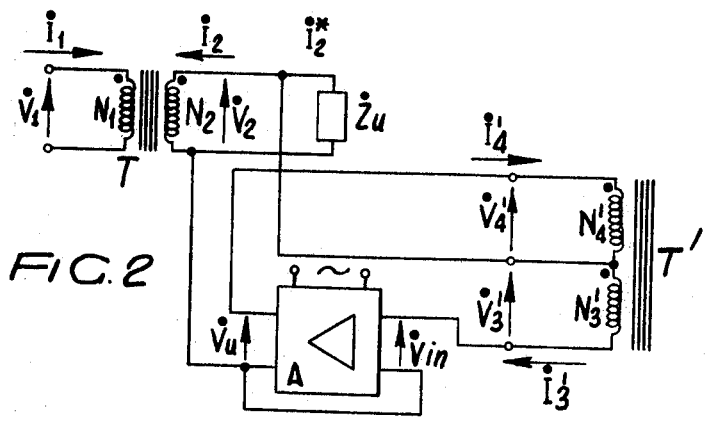
FIG. 2 is an electrical schematic diagram of a second embodiment of the invention for use on conventional current instrument transformers.

FIG. 2 shows a correction circuit for a current instrument transformer which is directly connected to the transformer T rather than inductively as is done in FIG. 1. The instrument transformer T in FIG. 2 has a primary winding $N_1$ and a secondary winding $N_2$ with the secondary winding $N_2$ being connected to the instrument impedance load $\dot{Z}_u$.

An image transformer T' is provided which includes an auxiliary winding $N_3'$ and an auxiliary winding $N_4'$ which correspond to the windings $N_4'$ and $N_3'$ in FIG. 1. Winding $N_3'$ is connected to the winding $N_2$ in series with the input of a high impedance, high gain amplifier A corresponding to the amplifier A in FIG. 1. The winding $N_3'$ is in parallel with load $\dot{Z}_u$ and connected so that the voltage across winding $N_2$ is subtracted from the voltage across winding $N_3'$ to give a voltage $\dot{V}_{in}$ at the input of the amplifier A corresponding to voltage $\dot{V}_1$ in FIG. 1.

The winding $N_4'$ is connected in series with winding $N_2$ and the output of amplifier A, and in parallel with the load $\dot{Z}_u$. The winding $N_4'$ is connected so that the voltages across windings $N_4'$ and $N_2$ sum.

In this manner, the winding $N_2$ acts not only as winding $N_2$ in FIG. 1, but also as windings $N_3$ and $N_4$ in FIG. 1. The current $\dot{I}_0$ necessary for the correction, circulating in $N_4'$ is inserted in the secondary circuit of T to correct the error of the transformer T.

Figure 3:
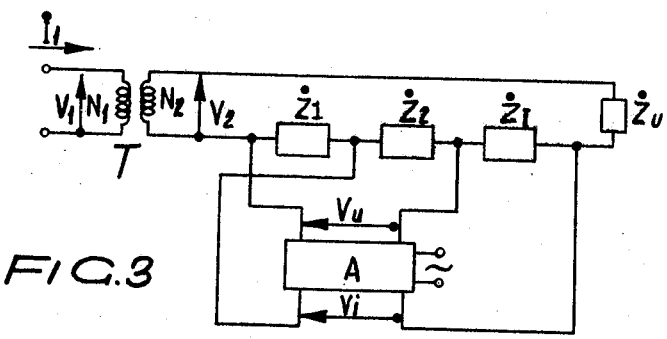
FIG. 3 is an electrical schematic diagram of a third embodiment of the invention for use on a conventional voltage instrument transformer.

FIG. 3 shows a correction circuit for a voltage instrument transformer rather than a current instrument transformer. The transformer T in FIG. 3 corresponds to the transformer T in FIGS. 1 and 2. The transformer T has a primary winding $N_1$ and a secondary winding $N_2$ with the secondary winding $N_2$ connected to the instrument impedance load $\dot{Z}_u$ in series with impedances $\dot{Z}_1$ and $\dot{Z}_2$.

Impedances $\dot{Z}_I$, $\dot{Z}_1$, and $\dot{Z}_2$ are reference impedances used to correct the voltage drop normally inherent in the transformer T. $\dot{Z}_1$ is substantially equal to $\dot{Z}_2$.

Amplifier A corresponding to the amplifiers A in FIGS. 1 and 2 is provided in FIG. 3. The input of amplifier A is connected across impedances $\dot{Z}_2$ and $\dot{Z}_I$ and the output thereof is connected across impedances $\dot{Z}_1$ and $\dot{Z}_2$. In this way the impedance $\dot{Z}_2$ is included both in the input and output circuit of the amplifier A. The output circuit of the amplifier A causes a voltage drop across impedances $\dot{Z}_1$ and $\dot{Z}_2$ opposite in polarity to that across impedances $\dot{Z}_u$ and $\dot{Z}_I$. This makes $\dot{Z}_I$ correspond to winding $N_3'$ in FIG. 1, $\dot{Z}_2$ to correspond to both windings $N_3$ and $N_4$ in FIG. 1, and $\dot{Z}_1$ to correspond to winding $N_4'$ in FIG. 1.

While load $\dot{Z}_I$ is disclosed as being equal to the inherent impedance load of transformer T, this is not necessary if the following equation is met:

$$\frac{\dot{Z}_I}{\text{inherent impedance load}} = \frac{\dot{Z}_2}{\dot{Z}_1}$$

This is because the difference in impedance loads is balanced out in the circuit when the equation is met.

This circuit restores the voltage drop in the secondary circuit of the transformer T normally caused by the inherent impedance of the transformer T.

What is claimed is:

1. A device for the automatic compensation of errors in measuring transformers through an independent power source, characterized in that such a device comprises: a measuring transformer, an image element reproducing the causes of the errors of the above mentioned measuring transformer and an amplifier fed by the independent power source having an input and output circuit, said input and said output circuits of said amplifier being respectively and contemporaneously coupled with said measuring transformer and said image element in such a way that an electric signal is provided to said input circuit, this electric signal being a function of the error of the measuring transformer while an amplified electric signal is supplied to said output circuit, this amplified electric signal adapted to supply the compensation of the transformer error automatically, and with any load condition of the measuring transformer.

2. A device according to claim 1 wherein said measuring transformer includes a core and a primary winding, a secondary winding, a first auxiliary winding and a second auxiliary winding all coupled to said core and said image element includes a transformer comprising a core, and a first winding and a second winding coupled to said second mentioned core; said second mentioned core having the same magnetic characteristics as said first mentioned core; said first auxiliary winding connected in series with said first winding and said input circuit of said amplifier, and with opposite polarity from said first winding; said second auxiliary winding connected in series with said second winding and said output circuit of said amplifier, and with the same polarity as said second winding to produce a current flow through said second auxiliary winding and supply the magnetic flux to said first mentioned core to compensate for the measuring transformer error; and further including an impedance load connected to said secondary winding.

3. A device according to claim 1 wherein said measuring transformer includes a core, and a primary and secondary winding coupled to said core; and said image element includes a second transformer including a core, and a first and second winding coupled to said second mentioned core; said first winding connected in series with said secondary winding and said input circuit of said amplifier, and in opposite polarity from said secondary winding; said second winding connected in series with said secondary winding and said output circuit of said amplifier in parallel with said first winding and said input circuit, and in the same polarity with said secondary winding to supply sufficient current flow through said secondary winding to correct the measuring transformer error; and further including an impedance load in series with said secondary winding and in parallel with said first and second windings and said input and output circuits of said amplifier.

4. A device according to claim 1 wherein said measuring transformer includes a primary winding and a secondary winding magnetically coupled and said image element includes a first impedance load, a second impedance load, and a third impedance load; and further including an instrument impedance load, said first, second, third and instrument impedance loads being connected across said secondary winding in series with other, said first impedance load having an impedance substantially equal to the inherent impedance of said measuring transformer and said second and third impedance loads being substantially equal in value, said input circuit of said amplifier begin connected across said first and second impedance loads and said output circuit of said amplifier being connected across said second and third impedance loads to supply to said measuring transformer the error correction needed due to the voltage drop produced by the inherent impedance of said transformer.

References Cited

UNITED STATES PATENTS

| 2,681,436 | 6/1954 | Schleicher | 324—127 |
| 3,051,874 | 8/1962 | Bonnet et al. | 323—57 X |
| 3,025,453 | 3/1962 | Malsbary | 323—61 |
| 3,094,657 | 6/1963 | Farry | 323—61 |

LEE T. HIX, Primary Examiner

G. GOLDBERG, Assistant Examiner

U.S. Cl. X.R.

323—48, 57; 324—127